US011783364B2

(12) United States Patent
Smith, Jr. et al.

(10) Patent No.: US 11,783,364 B2
(45) Date of Patent: *Oct. 10, 2023

(54) SYSTEMS AND METHODS FOR PROVIDING CUSTOMERS WITH MATCHING REWARDS

(71) Applicant: Capital One Services, LLC, McLean, VA (US)

(72) Inventors: Duane Smith, Jr., Oilville, VA (US); Ricardo Alvarez, Daniel Island, SC (US); Michael K. Nolan, Midlothian, VA (US); Kristi S. Hebner, Ashland, VA (US); Cathryn H. "Katie" Harlow, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/867,842

(22) Filed: May 6, 2020

(65) Prior Publication Data
US 2020/0265456 A1 Aug. 20, 2020

Related U.S. Application Data

(63) Continuation of application No. 16/295,697, filed on Mar. 7, 2019, now Pat. No. 10,679,235, which is a
(Continued)

(51) Int. Cl.
*G06Q 30/00* (2023.01)
*G06Q 30/0226* (2023.01)
(Continued)

(52) U.S. Cl.
CPC ....... *G06Q 30/0232* (2013.01); *G06F 16/168* (2019.01); *G06F 16/242* (2019.01);
(Continued)

(58) Field of Classification Search
None
See application file for complete search history.

(56) References Cited

U.S. PATENT DOCUMENTS 7,617,136 B1 * 11/2009 Lessing ............... G06Q 20/203
705/28
7,856,377 B2 * 12/2010 Cohagan ........... G06Q 30/0233
705/14.57
(Continued)

OTHER PUBLICATIONS

Berman, Barry. "Developing an effective customer loyalty program." California management review 49.1 (2006): 123-148 (Year: 2006).*
(Continued)

*Primary Examiner* — Gurkanwaljit Singh
(74) *Attorney, Agent, or Firm* — TROUTMAN PEPPER HAMILTON SANDERS LLP; Christopher J. Forstner; John A. Morrissett

(57) ABSTRACT

A computer-implemented method for providing account holders with a reward based on similar rewards previously obtained through other accounts. The method includes identifying, using one or more computer processors configured to access an account database, an eligible account based on eligibility criteria, wherein the eligible account is associated with an account of an account holder stored in the account database; receiving identifying data that identifies the eligible account; associating a customer identifier with the identifying data from the eligible account; for each customer identifier, receiving confirmation data associated with a separate account of the account holder, wherein the confirmation data comprises a reward variable; validating, using one or more computer processors, the confirmation data; and rewarding the eligible account with a matching variable, wherein the matching variable is approximately equal to the reward variable.

20 Claims, 5 Drawing Sheets

Related U.S. Application Data continuation of application No. 13/408,659, filed on Feb. 29, 2012, now Pat. No. 10,325,278.

(51) Int. Cl.

| | | |
|---|---|---|
| *H04N 21/478* | (2011.01) | |
| *G06F 16/16* | (2019.01) | |
| *H04N 21/4788* | (2011.01) | |
| *G06F 16/242* | (2019.01) | |
| *H04N 21/4725* | (2011.01) | |
| *G06Q 30/02* | (2023.01) | |

(52) U.S. Cl.
CPC ......... *G06Q 30/02* (2013.01); *G06Q 30/0229* (2013.01); *H04N 21/4725* (2013.01); *H04N 21/4788* (2013.01); *H04N 21/47815* (2013.01)

(56) References Cited

U.S. PATENT DOCUMENTS

| | | | | | |
|---|---|---|---|---|---|
| 8,180,671 | B2* | 5/2012 | Cohagan | ............ | G06Q 30/0233 705/14.27 |
| 8,732,739 | B2* | 5/2014 | Sillerman | ........ | H04N 21/42203 725/23 |
| 10,140,620 | B2* | 11/2018 | Heath | ............... | G06Q 30/02 |
| 2003/0233278 | A1* | 12/2003 | Marshall | ............... | G06Q 30/00 705/14.35 |
| 2004/0030637 | A1 | 2/2004 | Robison et al. | | |
| 2004/0122736 | A1* | 6/2004 | Strock | ............... | G06Q 30/0207 705/14.31 |
| 2004/0243468 | A1* | 12/2004 | Cohagan | ............ | G06Q 30/0229 705/14.23 |
| 2004/0260607 | A1* | 12/2004 | Robbins | ............. | G06Q 30/0238 705/15 |
| 2005/0043992 | A1* | 2/2005 | Cohagan | ............... | G06Q 30/02 705/14.27 |
| 2005/0149394 | A1* | 7/2005 | Postrel | ................... | G06Q 30/02 705/14.25 |
| 2006/0031120 | A1 | 2/2006 | Roehr et al. | | |
| 2006/0091203 | A1* | 5/2006 | Bakker | ..................... | G07F 5/18 235/381 |
| 2006/0259364 | A1* | 11/2006 | Strock | ................ | G06Q 30/0241 705/14.18 |
| 2007/0106556 | A1* | 5/2007 | Edwards | ............ | G06Q 30/0235 705/14.35 |
| 2007/0179840 | A1* | 8/2007 | Kroner | ............... | G06Q 30/0226 705/14.27 |
| 2007/0181674 | A1* | 8/2007 | Taylor | .................... | G07F 19/20 235/379 |
| 2008/0082418 | A1* | 4/2008 | Fordyce | ............. | G06Q 30/0234 705/14.1 |
| 2009/0144136 | A1 | 6/2009 | Cohagan et al. | | |
| 2010/0082418 | A1 | 4/2010 | Loeger et al. | | |
| 2010/0088174 | A1* | 4/2010 | Cohagan | ............ | G06Q 30/0231 705/14.33 |
| 2011/0035269 | A1* | 2/2011 | Cohagan | ............ | G06Q 30/0233 705/14.32 |
| 2012/0197707 | A1* | 8/2012 | Cohagan | ............ | G06Q 30/0232 705/14.27 |
| 2013/0073377 | A1* | 3/2013 | Heath | ................... | G06Q 30/02 705/14.39 |
| 2013/0222597 | A1* | 8/2013 | Brink | ................. | H04N 21/4781 348/157 |
| 2013/0346170 | A1* | 12/2013 | Epstein | ............. | G06Q 30/0226 705/14.14 |

OTHER PUBLICATIONS

Winer, Russell S. "Customer relationship management: a framework, research directions, and the future." Haas School of Business 43 (2001): 89-105. (Year: 2001).*

Thomas, Lyn C., Richard W. Oliver, and David J. Hand. "A survey of the issues in consumer credit modelling research." Journal of the Operational Research Society 56.9 (2005): 1006-1015. (Year: 2005).*

* cited by examiner

SYSTEMS AND METHODS FOR PROVIDING CUSTOMERS WITH MATCHING REWARDS

CROSS REFERENCE TO RELATED APPLICATIONS

This application is a continuation of, and claims priority under 35 U.S.C. § 120 to, U.S. patent application Ser. No. 16/295,697, filed Mar. 7, 2019, which is a continuation of U.S. patent application Ser. No. 13/408,659, filed Feb. 29, 2012, now U.S. Pat. No. 10,325,278, the entire contents of which are fully incorporated herein by reference.

FIELD OF THE DISCLOSURE

Embodiments of the present invention relate to systems and methods for providing an account holder with matching rewards.

BACKGROUND OF THE DISCLOSURE

An account holder may participate in a "rewards program" wherein the account holder's account earns rewards currencies (e.g., points, miles, or the like) based on purchases made using that account. Rewards currencies may then be redeemed by the account holder. Account holders may have multiple accounts with multiple providers, each with its own unique rewards program. Account holders lack incentive to switch accounts or open new accounts because they do not want to lose rewards they may have already earned from pre-existing accounts.

These and other drawbacks exist.

SUMMARY OF THE DISCLOSURE

Various exemplary embodiments provide for providing account holders with a reward based on similar rewards previously obtained through other accounts. An eligible account stored in a database may be identified based on an eligibility criteria. The eligible account may contain identifying data. For example, the identifying data may include the name of the account holder, the account number, or the type of account—such as a credit card account. A customer identifier that uniquely identifies the eligible account may be created and linked with the identifying data from the eligible account. Confirmation data is then received from an entity. The entity could be a third-party vendor, for example. The confirmation data may include rewards data from a separate account of the account holder. For example, the separate account may be an airline rewards account. The confirmation data may contain a reward variable, such as the number of free miles the separate account has accrued. The confirmation data is then be associated with the unique customer identifier. The confirmation data may also contain the name of the holder of the separate account. The confirmation data is then be validated. For example, the name of the account holder associated with the identifying data may be compared with the name of the holder of the separate account in the confirmation data to ensure they are the same person. The eligible account is then rewarded with a matching variable that is approximately equal to the reward variable from the confirmation data. For example, the eligible account may be rewarded with the amount of miles that the account holder accrued in his separate account. In that way the account holder may take advantage of rewards he or she accrued in his separate account.

BRIEF DESCRIPTION OF THE DRAWINGS

The present disclosure, together with further objects and advantages, may best be understood by reference to the following description taken in conjunction with the accompanying drawings, in the several Figures of which like reference numerals identify like elements, and in which.

DETAILED DESCRIPTION OF EXEMPLARY EMBODIMENT(S)

The following description is intended to convey a thorough understanding of the embodiments described by providing a number of specific embodiments and details involving systems and methods for providing an account holder with matching rewards. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for rewarding an account holder based on matching rewards accrued in a separate account.

Figure 1A:
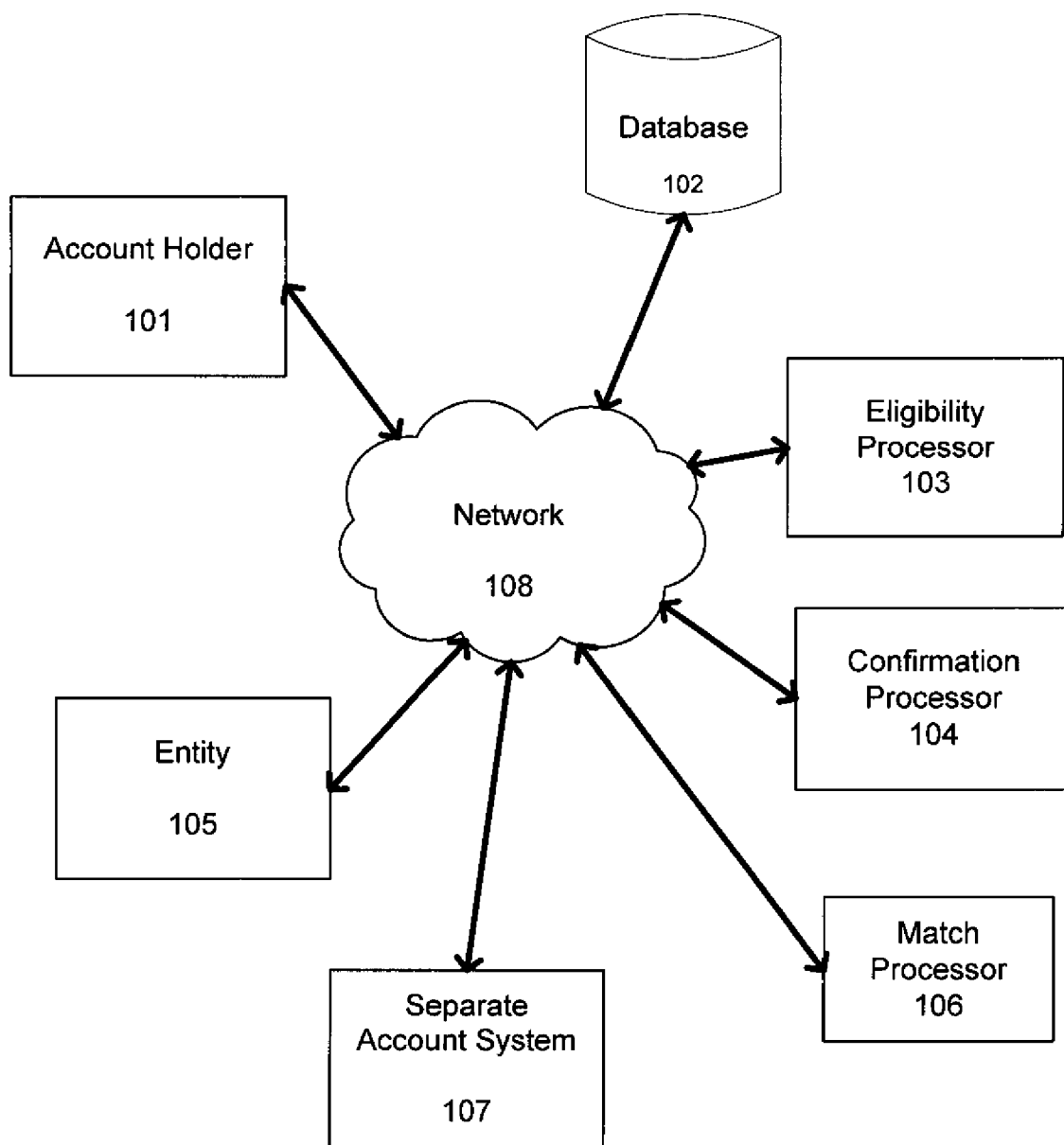
FIG. 1A depicts an exemplary system for providing an account holder with matching rewards.

FIG. 1A depicts an exemplary embodiment of a system for providing an account holder with matching rewards according to various embodiments of the disclosure. The system may involve various network-enabled computer systems, including, as depicted in FIG. 1A for example, an eligibility processor 103, a confirmation processor 104, and a match processor 106, which may be included as separate processors or combined into a single processor or device having the multiple processors. As referred to herein, a network-enabled computer system may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the processing of a transaction, as described herein.

The components depicted in FIG. 1A may store information in various electronic storage media, such as, for example, a database 102. Electronic information, files, and documents may be stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

The components depicted in FIG. 1A may be coupled via one or more networks, such as, for example, network 108. As referred to herein, a network may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In various exemplary embodiments, a network may include one, or any number of the exemplary types of networks mentioned above, operating as a stand alone network or in cooperation with each other. Use of the term network herein is not intended to limit the network to a single network. Also, the components depicted in FIG. 1A may communicate by electronic transmission through the one or more networks mentioned above, by physical delivery, or by any other communication mechanism. Communication between two components depicted in FIG. 1A may also include communication with any other entities between the two components.

In various exemplary embodiments, an account holder may be any individual or entity that desires to conduct a financial transaction using one or more accounts held at one or more account providers. Also, an account holder may be a computer system associated with or operated by such an individual or entity. As used herein, the term account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. An account provider may be, for example, a bank, other type of financial institution, including a credit card provider, for example, or any other entity that offers accounts to customers. An account may or may not have an associated card, such as, for example, a credit card for a credit account.

Various exemplary embodiments may provide a system for providing an account holder with matching rewards. As described in reference to FIG. 1A, eligibility processor 103 may be configured to query account database 102 via network 108 in order to identify an eligible account—as described below. The eligibility processor 103 may query account database 102 to identify an eligible account using eligibility criteria. The eligibility criteria may have been pre-programmed into the eligibility processor 103, for example.

Figure 1B:
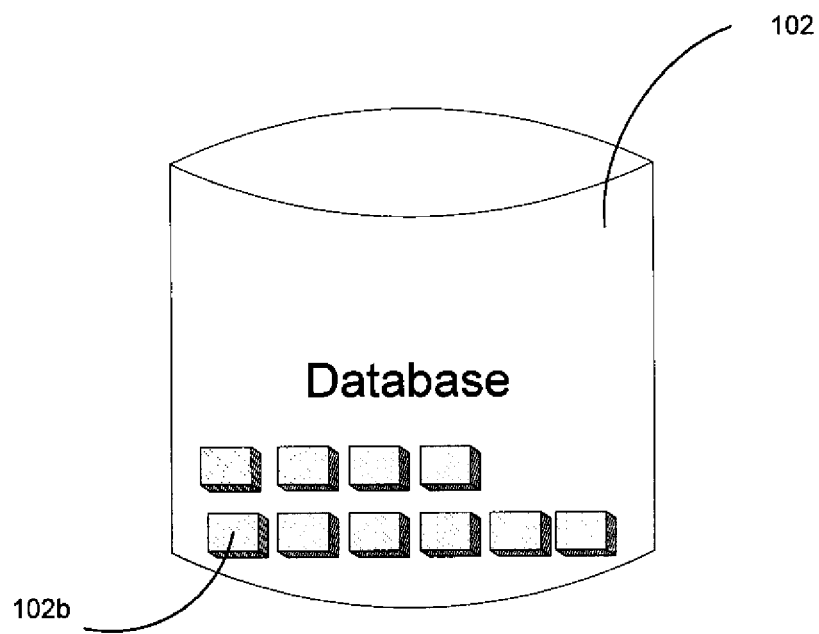
FIG. 1B depicts an exemplary database containing accounts according to various embodiments of the disclosure.

FIG. 1B depicts database 102 from FIG. 1A. Database 102 contains a number of accounts 102*b*. Each account 102*b* may be associated with one or more account holders. The eligibility processor may apply the eligibility criteria to one or more accounts 102*b* in database 102. Database 102 may be configured to associate rewards information with an account. For example, database 102 may associate the number of rewards points earned by a credit card account stored in database 102. The eligibility criteria may identify an eligible account based on the type of account. For example, the eligibility criteria may be designed to identify only line of credit or similar credit-related accounts including, for example, credit card accounts. The eligibility criteria may also identify an eligible account based on when the account was created. For example, the eligibility criteria may identify accounts that were created in the last three months or accounts that were created over 3 years ago. The eligibility criteria may be some combination of the aforementioned criteria. For example, the eligibility criteria may be designed to identify credit accounts that were created in the last three months. The aforementioned examples are non-limiting, and other eligibility criteria may be programmed into the eligibility processor 103.

Also, the eligibility criteria may be programmed to identify an eligible account by identifying an account holder with a pre-existing account. For example, the pre-existing account may be a checking account. The eligibility criteria then identifies this pre-existing account and notifies account holder 101 that he can create an eligible account, such as a new credit card account. If account holder 101 applies for a new credit card account in response to the notification, that new credit card account may be identified as an eligible account by the eligibility processor 103.

The eligibility processor 103 may be configured to extract identifying data associated with or about an eligible account. The identifying data may include an account identifier, such as an alpha-numeric code. The identifying data may also include the name of the account holder or the zip code associated with a physical address of the account holder.

Eligibility processor 103 may be configured to associate identifying data with a customer identifier. In various exemplary embodiments, the eligibility processor 103 may send the account holder 101 of an eligible account a notification informing the account holder 101 of their eligibility for receiving matching rewards. The notification may be sent as an email, for example, or using any other means of communication including, without limitation, via mail, text message, a social media medium, and the like. The notification may include the contact information of an entity 105 or other entity for administering the matching rewards program, including an entity associated with one or more of eligibility processor 103, confirmation processor 104, [more revisions on reverse side of page 7 of pdf]. For example, the email may include a Uniform Resource Locator (URL) identifying a website of the entity 105 and a passcode granting secured access to the entity's website. The entity's website may contain instructions for submitting information to the entity. The notification may also be sent via social media. For example, the notification may be sent to an account holder's Facebook® profile or Twitter® account or the like.

Eligibility processor 103 may also be configured to send the customer identifier and the identifying data to confirmation processor 104 via network 108.

The eligibility processor 103 may also be configured to send the identifying data and the customer identifier to entity 105 via network 108. Entity 105 may contain systems for processing information from account holder 101. For example, entity 105 may be a third-party vendor working together with a system for providing matching rewards to interact directly with account holder 101. Entity 105 may interact with account holder 101 via network 108. Entity 105 may compile confirmation data based on information received from account holder 101. The confirmation data may be associated with the customer identifier sent from eligibility processor 103. The confirmation data may comprise a reward variable that may represent an amount of reward units that account holder has associated with a separate account. In various exemplary embodiments, this reward variable may be validated by confirmation processor 104, as will be explained in more detail below. The reward variable may be based on information received by entity 105 from account holder 101 regarding a separate account of account holder 101 from separate account system 107. For example, the separate account in separate account system 107 may be an airline credit card or rewards program. Exemplary airline credit card/rewards programs may include, without limitation, Alaska Airlines® Visa Card, American Airlines® Card, Delta SkyMiles® Card, or a similar rewards account that may or may not be affiliated with a particular credit card. The reward variable may correspond to the number of miles earned by the account holder on their separate account from separate account system 107.

The confirmation data may further comprise a date the customer identifier was received by entity 105; a date the confirmation data was sent to confirmation processor 104; the customer identifier; and the name of the account holder of the separate account from separate account system 107.

In various exemplary embodiments, the functions performed by entity 105 may alternatively or additionally be performed by confirmation processor 104.

Entity 105 may then send the confirmation data to confirmation processor 104. Confirmation processor 104 may be configured to validate the confirmation data. The confirmation processor 104 may validate the confirmation data by comparing the identifying data with the confirmation data where both are associated with the same customer identifier. For example, confirmation processor 104 may be configured to compare the name of the account holder contained in the identifying data with the name of the account holder in the confirmation data. If the names do not match, the confirmation processor may be configured to send a notification to entity 105, informing entity 105 of the error. The confirmation processor may also be configured to send a notification to account holder 101 informing the account holder 101 of the lack of a match.

Confirmation processor 104 may also validate the confirmation data by comparing the reward variable to an acceptable range. The acceptable range may have been previously supplied to the confirmation processor 104. If confirmation processor 104 determines that the reward variable is outside the acceptable range, the confirmation processor 104 may send a notification to entity 105 informing entity 105 of the error.

Confirmation processor 104 may also validate the confirmation data by comparing the date the confirmation data was received to a date corresponding to when the eligible account was created. For example, the confirmation processor may be configured to eliminate confirmation data that was received more than 90 days after the eligible account was created. If the confirmation processor determines that the date the confirmation data was received post-dates the date the eligible account was created by more than 90 days, the confirmation processor may send entity 105 a notification informing entity 105 of the error. The confirmation processor 104 may also send account holder 101 a notification informing account holder 101 of the error. Alternatively or additionally, confirmation processor 104 may delete the confirmation data.

Confirmation processor 104 may also validate the confirmation data by comparing the value spent by eligible account to a threshold amount. For example, the threshold amount may be $1000. If account holder 101 has incurred fewer than $1000 in charges on the eligible account, confirmation processor 104 may send a notification to account holder 101, informing account holder 101 that the reward variable will not be applied until the account holder incurs $1000 in charges on the eligible account.

Confirmation processor 104 may also be configured to send the reward variable to match processor 106 via network 108. Match processor 106 may be configured to create a match variable based on the reward variable. For example, match processor 106 may assign the match variable a value equal to the reward variable. Match processor 106 may be configured to send the match variable to database 102 with instructions to update the eligible account to reflect the match variable. The steps performed by match processor 106 may also be accomplished by confirmation processor 104.

Figure 1C:
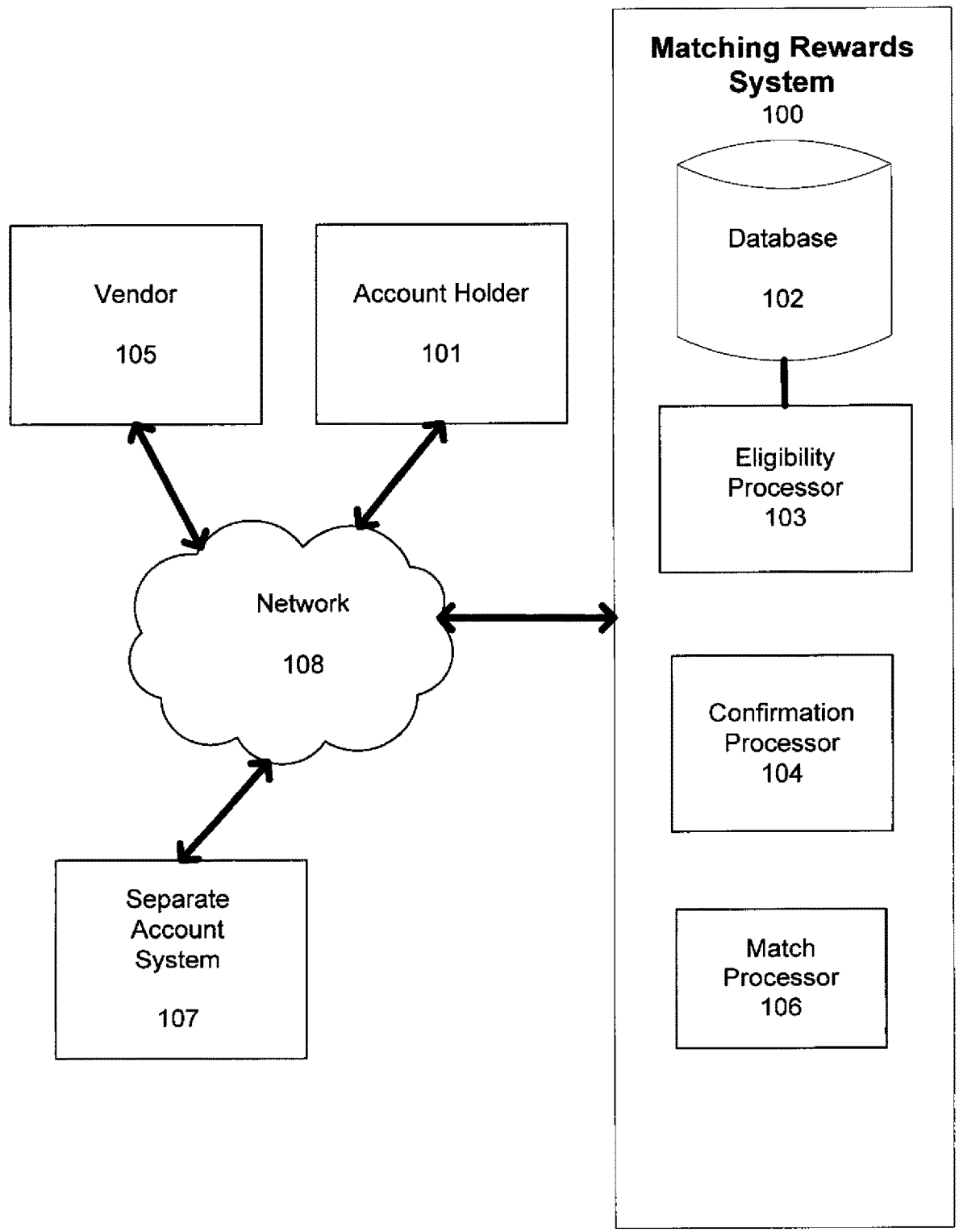
FIG. 1C depicts an exemplary embodiment of a system for providing an account holder with matching rewards.

FIG. 1C depicts an exemplary embodiment of a system for providing an account holder with matching rewards according to various embodiments of the disclosure. In FIG. 1C, database 102, eligibility processor 103, confirmation processor 104, and matching processor 106 may be integrally contained in matching rewards system 100. Matching rewards system 100 may be connected to entity 105, account holder 101, and separate account system 107 via network 108. Matching rewards system 100 may be separately connected to account holder 101, entity 105, and separate account system 107. The components of the system depicted in FIG. 1C may be configured to perform the same functions as the components depicted in FIG. 1A and described previously.

Figure 2:
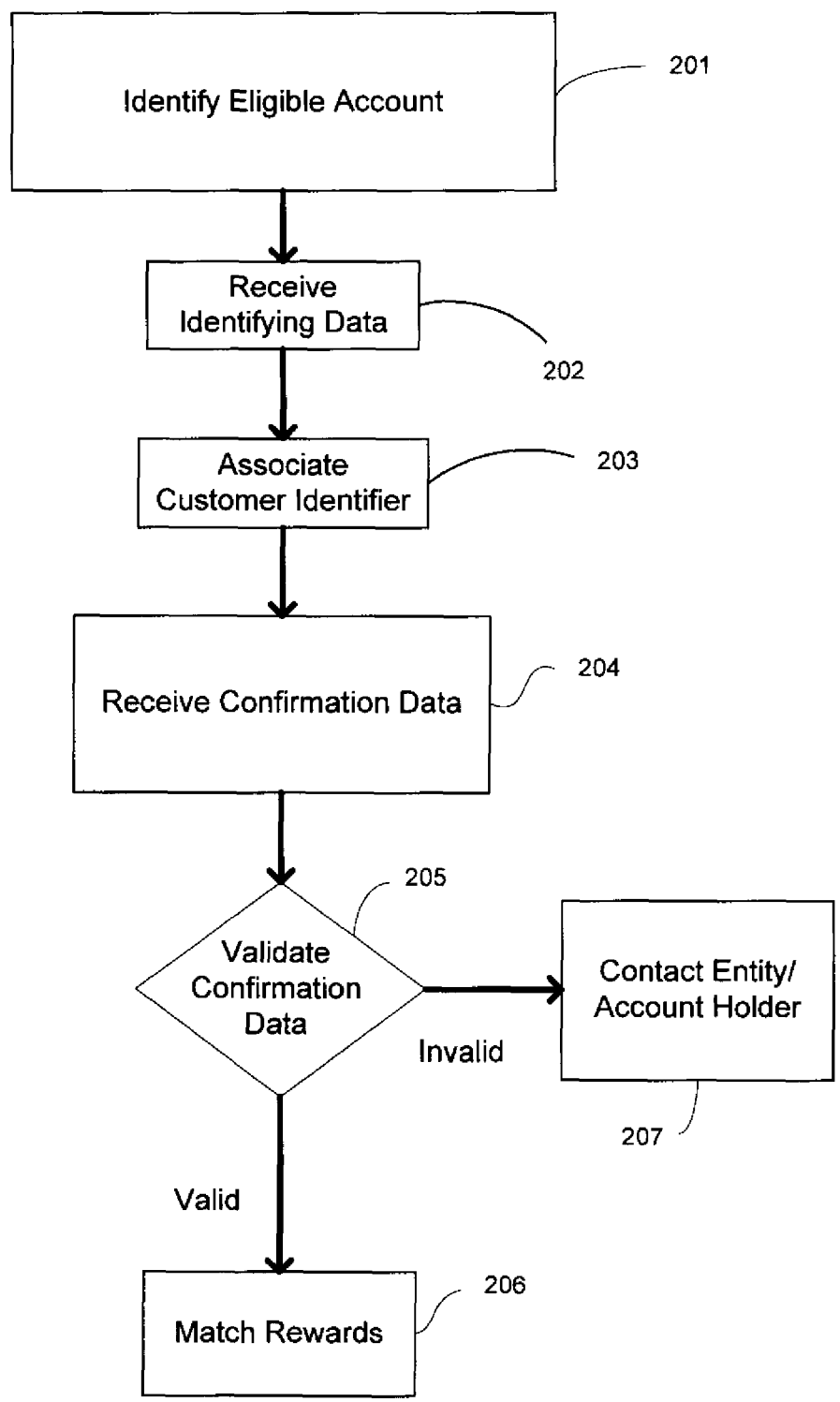
FIG. 2 depicts an exemplary method for providing an account holder with matching rewards.

FIG. 2 illustrates a flow diagram of a method for providing an account holder with matching rewards. This method is provided by way of example, as there are a variety of ways to carry out the methods disclosed herein. The method disclosed in FIG. 2 can be executed or otherwise performed by one or a combination of various systems disclosed herein, for example. The method shown in FIG. 2 is described below as carried out by the system in FIG. 1A, by way of example. Other like systems may be used. The exemplary method may begin at block 201.

At block 201, an eligibility processor may identify an eligible account within a database by applying an eligibility criteria to the various accounts in the database. The eligibility criteria may be designed to identify only credit card accounts. If the eligibility processor identifies an eligible account, the method may continue to block 202.

At block 202, the eligibility processor may receive identifying data from the eligible account from the database via a network. The identifying data may include the name of the account holder associated with the eligible account; the account number of the eligible account; the date the eligible account was created; and the zip code of the physical address associated with the account holder of the eligible account. Once the identifying data is received, the method may continue to block 203.

At block 203, the eligibility processor may associate a customer identifier with the eligible account. The customer identifier may be an alpha-numeric code or other customer identifying information. The customer identifier may be unique to the eligible account. Once the eligibility processor associates a customer identifier with the eligible account, the method may continue to block 204.

At block 204, a confirmation processor may receive the confirmation data from an entity. The confirmation data may include a reward variable that may be associated with a separate account of the account holder from a separate account system, for example. In various embodiments, the separate account system may be a system that administers a rewards program for the account holder. The rewards program administered by the separate account system may be associated with another rewards program in which the account holder participates. The entity may be a third-party vendor that communicates directly with the account holder. The entity may associate the customer identifier with the confirmation data. Once the confirmation processor receives the confirmation data, the method may continue to block 205, At block 205, the confirmation processor may validate the confirmation data. The confirmation processor may compare the name of the account holder from the identifying data with the name of the separate account holder in the confirmation data. If the names do not match, the confirmation processor may determine that the confirmation data is invalid. Also, the confirmation processor may compare the reward variable with an acceptable range. If the reward variable is outside the acceptable range, the confirmation processor may determine that the confirmation data is invalid. Also, the confirmation processor may compare the date the confirmation data was received with a date the eligible account was created. For example, if the date the confirmation data was received post-dates the date the eligible account was created by more than 90 days, the confirmation processor may determine the confirmation data is invalid. The aforementioned non-limiting examples are intended to show how block 205 may validate the confirmation data. Other similar comparisons may be used to validate the confirmation data. If the confirmation processor determines that the confirmation data is invalid, the confirmation processor may contact the account holder or the entity, as in block 207. In various embodiments, the account holder may attempt to restart the process by providing additional or other data to be validated. If the confirmation processor determines the confirmation data is valid, the method may continue to block 206.

At block 206, the confirmation processor may send the reward variable to a match processor, which may assign the value of the reward variable to a match variable. The match processor may then assign the match variable to the eligible account stored in a database associated with an account of the account holder.

Figure 3:
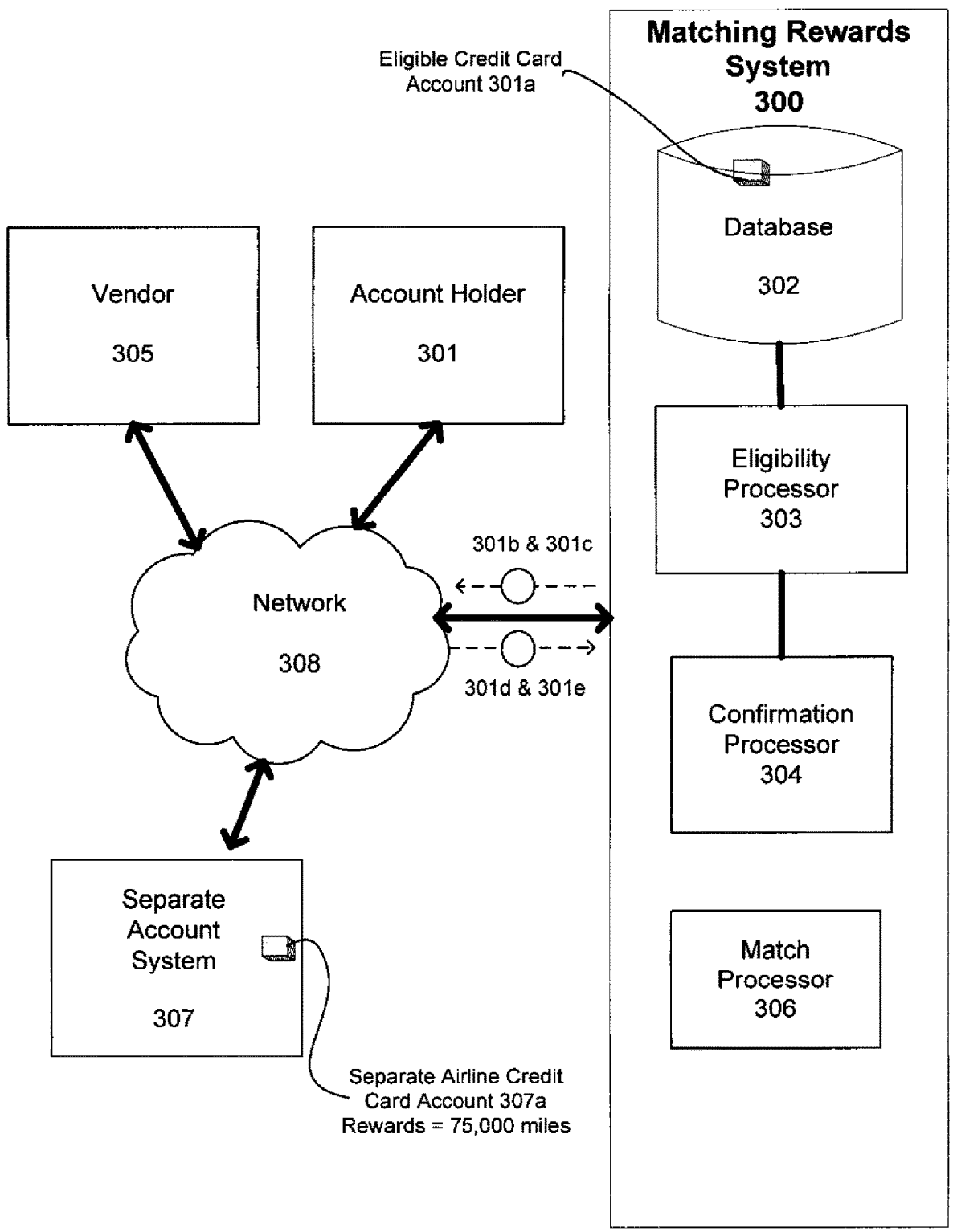
FIG. 3 depicts an exemplary system and related method for providing a credit card account holder with matching miles based on rewards earned in a separate airline credit card account.

FIG. 3 depicts an exemplary matching rewards system 300 and related method that implements a matching rewards program that matches an account holder's reward miles that were accrued in a separate airline credit card account. As described in reference to FIG. 3, eligibility processor 303 may query account database 302. The eligibility processor 303 may identify an eligible account 301a based on eligibility criteria. In this example, the eligibility criteria may identify accounts that are credit card accounts opened by an account holder within three months of the date the query was run. Eligible account 301a is a credit card account that was opened by account holder 301 two months before the query date. In this example, account holder 301 has a separate airline credit card account 307a stored that may be stored in separate account system 307. In this example, separate airline credit card account 307a may have 75,000 rewards miles associated with it.

Eligible credit card account 301a contains identifying data 301b. The eligibility processor 303 is configured to extract identifying data 301b from eligible account 301a. The identifying data 301b includes an account identifier, the name of the account holder 301, and the zip code associated with the physical address of the account holder 301.

Eligibility processor 303 may then associate identifying data 301b with a customer identifier 301c. At the same time, eligibility processor 303 may send the account holder 301 of eligible account 301a a notification informing the account holder of his eligibility for the matching rewards program. The notification may be sent to account holder 301 via network 308, for example. Also, the notification may be sent directly to account holder 301. In this example, the matching rewards system 300 may be configured to provide rewards to account holders who have spent $1,000 on their credit card account since applying for the matching program. In this example, the notification may be sent by email or other means of communication as described herein. The email may include the, for example, the URL for an entity 305 and a passcode to access the entity's website where account holder 301 will find instructions for applying for the matching rewards program.

Eligibility processor 303 also may send customer identifier 301c and identifying data 301b to confirmation processor 304.

Eligibility processor 303 also may send identifying data 301b and customer identifier 301c to entity 305. Entity 305 may be a third-party vendor that may be working with or on behalf of matching rewards system 300 to administer the matching rewards program. Entity 305 may compile confirmation data 301d based on information received from account holder 301. In this example, confirmation data 301d may be associated with the customer identifier 301c sent from eligibility processor 303. Confirmation data 301d may comprise a reward variable 301e. The reward variable may be based on information received by entity 305 from account holder 301 regarding a separate airline credit card account 307a. The separate airline credit card account 307a may be stored in separate account system 307. The reward variable 301e may correspond to the number of miles earned by the account holder 301 on their separate airline credit card account 307a, which in this example may be 75,000 miles.

Confirmation data 301d further may comprise a date the customer identifier 301c was received by entity 305; a date the confirmation data 301d was sent to confirmation processor 304; the customer identifier 301c; and the name of the account holder of the separate airline credit card account 307a.

Third-party vendor 305 may then send the confirmation data 301d and reward variable 301e to confirmation processor 304. Confirmation processor 304 then may validate confirmation data 301d. Validation may occur in several steps or in a single step. In this example, validation occurs in several steps. First, the confirmation processor may compare the name of the account holder 301 contained in the identifying data 301b with the name of the account holder in the confirmation data 301d. If the names do not match, the confirmation may send a notification to entity 305, informing entity 305 of the error and suspend the process.

If the confirmation data passes the first step, the confirmation processor may compare the reward variable 301e to an acceptable range. In this example, the acceptable range is between 0 and 100,000 reward units or "points." If the reward variable 301e greater than the maximum value of the acceptable range, the reward variable 301e may be assigned the maximum value, e.g., a value of 100,000. If the reward variable 301e is less than the minimum value of the acceptable range, the confirmation processor 304 sends a notification to entity 305 informing entity 305 of the error and suspends the process. In this example, the reward variable 301e may be 75,000, which is within the acceptable range.

If the confirmation data passes the second step, the confirmation processor may compare the amount spent by the eligible account 301a to a threshold amount. In this example, the threshold amount may be $1000. If the account holder 301 has incurred less than $1000 in charges on the eligible account, the confirmation processor 304 sends a notification to account holder 301 informing him that he will receive his matching reward after he has accrued $1000 in charges on his eligible account 301a. Confirmation processor 304 may be further configured to monitor the transactions of eligible account 301a and the matching variable 301e can be applied after the threshold amount has been exceeded.

If the confirmation data passes the third step, confirmation processor 304 determines that confirmation data 301d is valid and sends the reward variable 301e to match processor 306. Match processor 306 creates a match variable and assigns it the value of the reward variable 301e. Match processor 306 then provides the match variable to eligible account 301a and updates eligible account 301a in database 302. Thus, eligible account 301a will be rewarded with the number of frequent flyer miles accrued on the account holder's separate airline credit card account 307a. In this example, eligible account 301a may be rewarded with 75,000 miles.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A method for providing an account holder with a reward based on rewards previously obtained through another account, comprising:
    identifying, with one or more processors, an eligible account of one or more accounts by querying an account database via a network using eligibility criteria comprising an eligible account type and a maximum account age, by determining whether the eligible account comprises the eligible account type and the maximum account age;
    extracting, by the one or more processors, from the eligible account, identifying data and a date the eligible account was created;
    associating, with the one or more processors, a customer identifier with the identifying data from the eligible account;
    receiving, at the one or more processors, confirmation data associated with a separate account of the account holder, the confirmation data comprising the customer identifier, a date the confirmation data was sent, and a reward variable comprising a value of reward points previously accumulated from the separate account;
    associating the confirmation data with the customer identifier;
    validating, with the one or more processors, the confirmation data by:
        determining that a value spent using the eligible account exceeds a threshold amount during a first period of time; and
        determining whether the eligible account was created within a second period of time from the date the confirmation data was sent; and
    responsive to validating the confirmation data:
        converting, with the one or more processors, the value of the reward points of the reward variable to an equivalent value of a matching variable associated with the eligible account when the eligible account was created within the second period of time;
        updating, with the one or more processors, the eligible account to include the matching variable in the account database;
    automatically generating, with the one or more processors, a notification comprising a URL identifying a website of an entity administering the eligible account; and
    transmitting, with the one or more processors, the notification to the account holder.

2. The method of claim 1, wherein the confirmation data further comprises a customer name.

3. The method of claim 1, wherein the matching variable is assigned the same number of reward points previously accumulated from the separate account.

4. The method of claim 3, further comprising:
    determining, with the one or more processors, that the value of the reward points previously accumulated from the separate account exceeds a predetermined maximum value; and
    assigning, with the one or more processors, a value of reward points to the matching variable equal to the predetermined maximum value.

5. The method of claim 4, further comprising updating the eligibility criteria associated with the eligible account with the matching variable.

6. The method of claim 1, further comprising:
    determining, with the one or more processors, that the eligible account was not created within the second period of time; and
    sending, with the one or more processors, a notification to a first vendor that an error has occurred based on the determination that the eligible account was not created within the second period of time.

7. The method of claim 6, wherein the eligible account is not rewarded with a matching variable based on the determination that the eligible account was not created within the second period of time.

8. The method of claim 6, further comprising:
    deleting, with the one or more processors, the confirmation data based on the determination that the eligible account was not created within the second period of time.

9. The method of claim 8, further comprising:
    sending, with the one or more processors, the account holder an alert email requesting updated confirmation data.

10. The method of claim 1, further comprising:
    comparing, with the one or more processors, the confirmation data with the identifying data to determine that the confirmation data is accurate.

11. The method of claim 1, further comprising: sending, with the one or more processors, the customer identifier to a second vendor to compile the confirmation data associated with the separate account of the account holder.

12. A system for providing account holders with matching rewards based on existing rewards previously obtained through other accounts, the system comprising:
one or more processors including at least an eligibility processor, a confirmation processor, and a match processor; and
memory in communication with the one or more processors and storing instructions that, when executed by the one or more processors, are configured to cause the one or more processors to:
retrieve, with the eligibility processor, one or more accounts associated with an account holder from an account database server, the account database server comprising one or more accounts;
query, with the eligibility processor, an account database via a network to identify an eligible account of the one or more accounts associated with the account holder based on eligibility criteria comprising an eligible account type and a maximum account age by determining whether the eligible account comprises the eligible account type and the maximum account age;
extract identifying data that identifies the eligible account and a date the eligible account was created;
receive, at the confirmation processor an indication of the eligible account, the date the eligible account was created, and confirmation data associated with a separate account of the account holder, the confirmation data comprising a date the confirmation data was sent and a reward variable comprising reward points previously accumulated from the separate account;
associate the confirmation data with the customer identifier;
determine, with the confirmation processor, that a value spent using the eligible account exceeds a threshold amount during a first period of time;
determine, with the confirmation processor, that the eligible account was created within a second period of time from the date the confirmation data was received;
convert, with the match processor, the value of the reward points of the reward variable to an equivalent value of a matching variable associated with the eligible account when the eligible account was created within the second period of time;
update, with the match processor, the eligible account to include the matching variable in the account database;
automatically generating, with the one or more processors, a notification comprising a URL identifying a website of an entity administering the eligible account and a passcode for granting access; and
transmit, with the one or more processors, the notification to the account holder.

13. The system of claim 12, wherein the identifying data includes at least one of an account identifier, a customer name, or a zip code associated with the account holder.

14. The system of claim 12, wherein the instructions further cause the one or more processors to:
send a notification to the account holder that the eligible account has not been rewarded with the reward variable during the first period of time based on the determination that the value spent by the eligible account has not exceed the threshold amount.

15. The system of claim 12, wherein the confirmation data further comprises at least one of a date the identifying data was received or a customer name.

16. The system of claim 12, wherein the instructions further cause the one or more processors to:
validate, with the confirmation processor, the confirmation data by comparing the confirmation data with the identifying data to determine that the confirmation data is accurate.

17. The system of claim 12, wherein the instructions further cause the one or more processors to:
send a notification to the account holder indicating that the eligible account was rewarded with the reward variable based on the determination that the value spent by the eligible account exceeded the threshold amount during the second period of time.

18. The system of claim 12, wherein the instructions further cause the one or more processors to:
assign the value of the reward variable to the matching variable.

19. The system of claim 18, wherein the instructions further cause the one or more processors to:
update the eligibility criteria with the matching variable.

20. A method for providing an account holder with a reward based on rewards previously obtained through another account, comprising:
querying, with one or more processors, an account database via a network to identify an eligible account of the one or more accounts based on eligibility criteria comprising an eligible account type and a maximum account age, by determining whether the eligible account comprises the eligible account type and the maximum account age;
extracting, by the one or more processors, identifying data that identifies the eligible account and a date the eligible account was created;
associating, with the one or more processors, a customer identifier with the identifying data from the eligible account;
receiving, at the one or more processors, confirmation data associated with each of one or more separate accounts of the account holder, the confirmation data comprising, for each separate account, the customer identifier, a date the confirmation data was sent, and a reward variable, the reward variable comprising a value of reward points previously accumulated from the separate account;
validating, with the one or more processors, the confirmation data for each separate account by determining whether the reward variable for each separate account exceeds a predetermined threshold value of rewards points;
responsive to determining that the reward variable for a first separate account of the one or more separate accounts does not exceed the predetermined threshold, converting, with the one or more processors, the value of the reward points of the reward variable to an equivalent value of a first matching variable of one or more matching variables associated with the eligible account;
responsive to determining that the reward variable for a second separate account of the one or more separate accounts exceeds the predetermined threshold:
assigning the reward variable of the second separate account the predetermined threshold value of rewards points;

converting, with the one or more processors, the value of the reward points of the reward variable of the second separate account to an equivalent value of a second matching variable of the one or more matching variables associated with the eligible account;

updating, with the match processor, the eligible account to include each of the one or more matching variables in the account database.

\* \* \* \* \*